April 9, 1940.                F. GEISE                    2,196,411
               DIFFERENTIAL PROTECTIVE RELAYING SYSTEM
                        Filed Jan. 22, 1938

WITNESSES:
E. F. Oberheim
F. P. Lyle

INVENTOR
Fritz Geise.
BY O. B. Buchanan
ATTORNEY

Patented Apr. 9, 1940

2,196,411

UNITED STATES PATENT OFFICE 2,196,411

DIFFERENTIAL PROTECTIVE RELAYING SYSTEM

Fritz Geise, Berlin-Karlshorst, Germany, assignor to Westinghouse Electric & Manufacturing Company, East Pittsburgh, Pa., a corporation of Pennsylvania Application January 22, 1938, Serial No. 186,427
In Germany January 23, 1937

10 Claims. (Cl. 175—294)

The present invention relates to differential protective relaying systems, and more specifically to means for preventing the operation of such systems in response to transient currents.

Differential relaying systems of the type which this invention concerns are used for the protection of electrical apparatus and usually comprise current transformers connected on each side of the apparatus to be protected and a relay energized by a current equal or proportional to the difference of the secondary currents of the transformers. When the relay is energized by a differential current caused by some abnormal condition, it effects actuation of a circuit breaker or other switching device to disconnect the apparatus from the line and thus protect it from damage. When a system of this type is used with inductive apparatus such as a transformer, the transient magnetizing current which occurs when the circuit is closed often causes improper operation of the relay since it only affects the current transformer on one side of the apparatus.

It has been proposed to avoid this improper operation by the use of a time delay element with the differential relay. Since the transient lasts for only a very short time until the steady-state is reached, this is effective in preventing improper operation of the relay. Such an arrangement is undesirable, however, because it decreases the sensitivity of the relay and also because it limits the usefulness of such systems for high speed protective relaying in networks.

Another method for preventing operation of the differential relay by the transient current is to provide an auxiliary contact in the relay circuit which is controlled by a direct-current relay. The latter relay is actuated by the direct-current component of the transient and opens the contact, thereby making the differential relay inoperative while the transient exists. This arrangement, however, requires a special relay and also an additional contact in the relay circuit and therefore decreases the sensitivity of the system while making it more complicated.

The object of the present invention is to provide a differential protective relaying system which will not be affected by the occurrence of a transient magnetizing current caused by closing the circuit.

A more specific object is to provide means for energizing a differential relay which will not function when the energizing current contains a direct-current component but which will not decrease the sensitivity of the system.

The present invention provides means for attaining these objects which avoid the disadvantages of the above-mentioned arrangements by providing in the current transformer circuit an intermediate transformer or other electromagnetic device from which the differential relay is energized. This device has a magnetic circuit of material having high residual magnetism and a low saturation value, so that when it has been magnetized by the direct-current component of the transient, the differential relay cannot be energized until after the steady-state has been reached and an alternating current has removed the effect of this direct-current magnetization.

The invention may be applied in various ways. The magnetic circuits of the current transformers themselves may have the characteristics mentioned above but this is unsatisfactory because of the wide variation in the primary currents of these transformers. It is more satisfactory, therefore, to provide an intermediate transformer which is connected so that its primary carries the differential current and the relay is energized from its secondary. The invention may also be applied to certain types of relays by making the magnetic circuit of the relay itself of magnetic material having the characteristics described above.

The invention will be more fully understood from the following detailed description of a preferred embodiment taken in connection with the accompanying drawing, in which.

Figure 3:
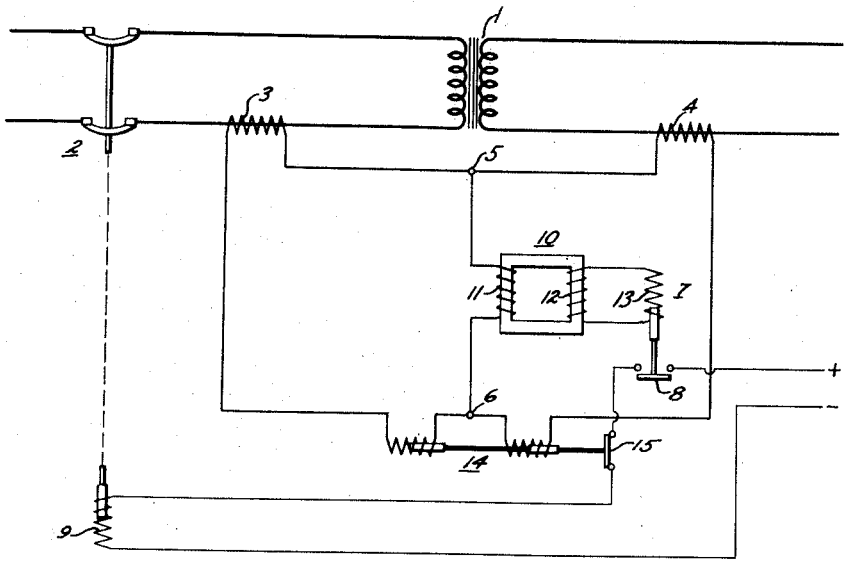
Fig. 3 is a diagram showing a preferred arrangement for carrying out the invention; and, Fig. 4 is a magnetization curve of a material suitable for use in the invention.

Referring to Fig. 3, the invention is shown as applied to a differential relay system for the protection of a power transformer 1 provided with a circuit breaker or other switching device 2. Two current transformers 3 and 4 are connected on opposite sides of the transformer 1 and are connected together in a bridge circuit with their voltages in the same direction so that a differential current equal to the difference of the currents in the two transformers will flow between the points 5 and 6. A differential relay 7 is provided and is arranged to be energized in response to a differential current flowing between the points 5 and 6. When this relay is energized and closes its contact 8, it completes a circuit through the operating coil 9 of the circuit breaker 2 as clearly shown on the drawing.

Figure 1:
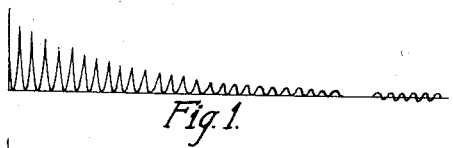
Figure 1 shows the transient current which occurs when an inductive circuit is closed.

When the circuit of the transformer 1 is closed, a transient magnetizing current having the general form shown in Fig. 1 occurs. This current consists of a direct-current component superposed on the alternating current. The direct-current component gradually dies out and reaches zero when the steady state is reached. Since the magnetizing current appears only in the primary winding of the transformer 1, the transient will only affect the current transformer on that side of the transformer 1 and a differential current having approximately the same wave form as the transient will, therefore, flow between the points 5 and 6. If the relay 7 were energized directly from this current, it would be caused to operate whenever the circuit of the transformer was closed. In order to avoid this improper operation an intermediate transformer 10 is provided. The primary winding 11 of this transformer is connected between the points 5 and 6 so that the differential current flows through it, and the secondary winding 12 is connected to the operating coil 13 of the relay 7.

Figure 2:
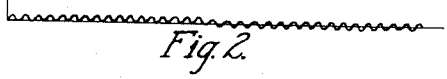
Fig. 2 shows the desired exciting current for the differential relay.
Figure 4:
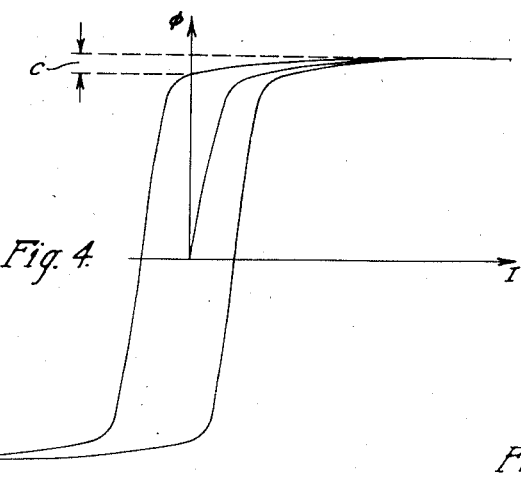

The core of the intermediate transformer 10 is made of a magnetic material having a magnetization curve such as that shown in Fig. 4. It will be seen from this curve that it has a high residual magnetism and a relatively low saturation point, so that after magnetization by a direct current, a relatively large change in current will produce a very small change in the flux, such as indicated at C. The effect of this is that the direct-current component of the transient will magnetize the core of the transformer 10 and because of its high residual magnetism, as the direct-current component dies away the core will remain saturated and the pulsations of the resultant differential current will produce only a very small variation in flux so that the induced electromotive force in the secondary of the transformer will be very small. This will produce a current in the coil 13 having approximately the form shown in Fig. 2 and this current will be too small to cause operation of the relay so that the system is not affected by the presence of the transient. After the steady state has been reached, any differential current flowing through the primary of the transformer 10 will be an alternating current which will remove the effect of the direct-current magnetization and induce a large enough electromotive force in the secondary to operate the relay 7.

A stabilizing relay 14 has been shown having contacts 15 in the circuit of the coil 9. This relay is adjusted to open its contacts in response to the occurrence of heavy through currents in the transformer 1 and thus prevent tripping of the circuit breaker in case of improper operation of the relay 7 under these conditions. This relay is not essential to the operation of the system and may be omitted if desired.

Since the transformer 10 supplies only the small amount of energy required to operate the relay 7, it can be made very small. Any suitable magnetic material may be used for its core having a magnetization curve such as shown in Fig. 4. Alloys of nickel and iron having high initial permeability and a low saturation value have been found satisfactory for this purpose.

It will be apparent that the invention may be carried out in other ways. For example, in place of the intermediate transformer a choke coil having a magnetic circuit with the properties described above may be used and the relay 7 connected in parallel with it. In case the current transformers are connected in series with their voltages opposing, the primary winding of the transformer 10 may be connected in the series circuit between the two transformers. In either of these cases, the operation is substantially the same as described above. In order to increase the effectiveness of the transformer 10 and, therefore, the sensitivity of the system, a second transformer of similar construction may be connected to its secondary and the relay 7 excited from the secondary of the latter transformer. In the same way, a choke coil may be connected across the secondary of the transformer 10 and the relay connected in parallel with this coil.

Although a specific embodiment of the invention has been illustrated and described, it is to be understood that numerous other embodiments and modifications may be used and the invention is, therefore, not limited to the particular arrangement shown but includes all equivalent embodiments and modifications which fall within the scope of the appended claims.

I claim as my invention:

1. In a protective system for electrical apparatus which is subject to transient currents containing a direct current component, a current transformer on each side of the apparatus, a circuit carrying a current equal to the difference of the currents in the transformers, a relay, and means for energizing the relay from said differential current comprising an electromagnetic device having a magnetic circuit adapted to be saturated by said direct-current component and to remain saturated until the transient current has substantially disappeared.

2. In a protective system for electrical apparatus, a current transformer on each side of the apparatus, a circuit carrying a current equal to the difference of the currents in the transformers, a relay energized in response to said differential current, and means to prevent energization of said relay in response to a transient current containing a direct-current component, comprising a magnetizable device in the energizing circuit of the relay having a magnetic circuit adapted to be saturated by said direct-current component and to remain saturated until the transient current has substantially disappeared.

3. In a protective system for electrical apparatus, a current transformer on each side of said apparatus, a circuit carrying a curent equal to the difference of the currents in the transformers, a relay energized in response to said differential current, and means connected in said circuit to prevent energization of said relay in response to a transient current containing a direct-current component, comprising a magnetizable device having a magnetic circuit adapted to be saturated by said direct current component and to remain saturated until the direct current component has decreased to substantially zero.

4. In a protective system for electrical apparatus which is subject to transient currents containing a direct current component, a current transformer on each side of said apparatus, a circuit carrying a current equal to the difference of the currents in the transformers, a relay energized in response to said differential current, and means in said circuit for energizing the relay having a magnetic circuit adapted to be saturated by said direct current component and to remain saturated until the direct current component has decreased to substantially zero.

5. A protective system for electrical apparatus which is subject to transient currents containing a direct-current component comprising a current transformer on each side of the apparatus, a circuit carrying a current equal to the difference of the transformer currents, a switching device, a relay controlling the switching device, and means in said circuit for energizing the relay in response to the differential current, said means including a magnetic circuit of material adapted to be saturated by the direct-current component of said transient current and to remain saturated as long as the direct-current component exists.

6. A protective system for electrical apparatus which is subject to transient currents containing a direct-current component comprising a current transformer on each side of said apparatus, a circuit connecting the transformers and having a branch which carries a current equal to the difference of the transformer currents, a switching device, a relay controlling the switching device, and means for energizing the relay from said differential current, said means including a magnetic circuit of material adapted to be saturated by the direct-current component of said transient current and to remain saturated as long as the direct-current component exists.

7. A protective system for electrical apparatus which is subject to transient currents containing a direct-current component comprising a current transformer on each side of said apparatus, a circuit connecting the transformers and having a branch which carries a current equal to the difference of the transformer currents, an intermediate transformer having its primary winding connected in said branch, a relay connected to the secondary winding of said intermediate transformer to be energized thereby, and a switching device controlled by the relay, said intermediate transformer having a magnetic circuit adapted to be saturated by the direct-current component of said transient current and to remain saturated as long as the direct-current component exists.

8. A protective system for electrical apparatus which is subject to transient currents containing a direct-current component, comprising an auxiliary circuit, means for producing a current in said auxiliary circuit proportional to the difference of the input and output currents of said apparatus, a relay for controlling the circuit of said apparatus, and means for energizing the relay in response to the current in said auxiliary circuit, said last mentioned means including a magnetic circuit adapted to be saturated by the direct-current component of said transient current and to remain saturated until the direct current component has substantially disappeared.

9. A protective system for electrical apparatus which is subject to transient currents containing a direct-current component, comprising an auxiliary circuit, means for producing a current in said auxiliary circuit proportional to the difference of the input and output currents of said apparatus, a relay for controlling the circuit of said apparatus, and a transformer for energizing the relay in response to the current in said auxiliary circuit, said transformer having a magnetic circuit adapted to be saturated by the direct-current component of said transient current and to remain saturated until the direct current component has substantially disappeared.

10. In a differential protective relaying system for electrical apparatus which is subject to transient currents containing a direct-current component, relay means for controlling the circuit of said apparatus in response to the difference between the input and output currents of the apparatus, and means for preventing operation of the relay means on said transient currents comprising electro-magnetic means for energizing the relay having a magnetic circuit adapted to be saturated by the direct-current component of the transient current and to remain saturated until the direct current component has substantially disappeared.

FRITZ GEISE.